United States Patent [19]

Ito et al.

[11] Patent Number: 5,073,011
[45] Date of Patent: Dec. 17, 1991

[54] ELECTROCHROMIC DEVICE WITH A REFERENCE ELECTROCHROMIC ELEMENT

[75] Inventors: Toshiyasu Ito, Kasugai; Takaaki Mori, Inazawa; Mamoru Kato; Toshiya Uemura, both of Nagoya, all of Japan

[73] Assignee: Toyoda Gosei Co., Ltd., Nishikasugai, Japan

[21] Appl. No.: 605,359

[22] Filed: Oct. 30, 1990

[30] Foreign Application Priority Data

Oct. 31, 1989 [JP] Japan ............................. 1-127326[U]

[51] Int. Cl.$^5$ ................................................ G02F 1/01
[52] U.S. Cl. ...................................................... 359/265
[58] Field of Search ................................ 350/357, 353

[56] References Cited

U.S. PATENT DOCUMENTS

| | | | |
|---|---|---|---|
| 4,479,121 | 10/1984 | Tabata | 350/357 |
| 4,664,934 | 5/1987 | Ito et al. | 427/38 |
| 4,750,816 | 6/1988 | Ito et al. | 350/357 |
| 4,787,716 | 11/1988 | Kato et al. | 350/357 |
| 4,832,468 | 5/1989 | Ito et al. | 350/357 |
| 4,872,745 | 10/1989 | Fujisawa et al. | 350/357 |
| 4,874,229 | 10/1989 | Ito et al. | 350/357 |
| 4,927,246 | 5/1990 | Ito et al. | 350/357 |
| 4,933,050 | 6/1990 | Ito et al. | 204/15 |

FOREIGN PATENT DOCUMENTS 54-5458  1/1979  Japan .................... 350/357

*Primary Examiner*—William Mintel
*Assistant Examiner*—Roy Potter
*Attorney, Agent, or Firm*—Cushman, Darby & Cushman

[57] ABSTRACT

An electrochromic device is disclosed. The electrochromic device includes a pair of bases, and both a primary and a reference electrochromic element provided between the bases. The reference electrode is electrically connected to the primary electrochromic element so as to maintain the color-developing and fading potentials of the primary electrochromic element at predetermined voltages. A power regulator is also provided for driving the primary electrochromic element based in part on the output of the reference electrochromic element.

9 Claims, 2 Drawing Sheets

ELECTROCHROMIC DEVICE WITH A REFERENCE ELECTROCHROMIC ELEMENT

This application claims the priority of Japanese Utility Model Application No. 1-127326 filed on Oct. 31, 1989, which is incorporated herein by reference.

BACKGROUND OF THE INVENTION

1. Field of the Invention

The present invention relates generally to an electrochromic device used as a display unit, a dimmer or the like. More particularly, a driver arrangement for the electrochromic device is disclosed.

2. Description of the Related Art

Electrochromic devices (referred to as ECD hereinafter) having an electrochromic elements (referred to as ECE hereinafter) are generally known. A typical ECD of a related art is disclosed in U.S. Pat. No. 4,750,816. The ECE disclosed therein has a pair of transparent electrodes disposed between a pair of transparent bases. Between the electrodes, two facing color-developing layers are provided. One is an organic oxidation color-developing layer made of polyaniline, and the other is an inorganic reduction color-developing layer made of tungsten oxide. An electrolyte layer is formed between the color-developing layers. The ECD also has a voltage stabilizer which applies a predetermined voltage to the ECE during a color-developing process and a reverse voltage during a color-fading process.

In the foregoing ECD however, extended repetitions of the color-developing and fading actions will cause an uneven distribution of electric charge due to properties of the electrolyte. This changes the electric potential of the color-developing layers. Such electrical variation tends to deteriorate the polyaniline layer thereby reducing the ECE's ability to fully fade.

SUMMARY OF THE INVENTION

Accordingly, a primary object of the present invention is to provide an electrochromic device wherein electric potential remains stable with extended use, avoids significant deterioration of the color-developing layer, and maintains good color-fading, even with extended repetitions of the color-developing and fading actions.

To achieve the foregoing and other objects and in accordance with the purpose of the present invention, an improved electrochromic device is provided. The electrochromic device includes a pair of bases, a primary electrochromic element and a reference electrochromic element. The primary electrochromic element is formed between the bases. The reference electrochromic element is formed from a segregated portion of the primary electrochromic element. The device also includes a power regulator for driving the primary electrochromic element with reference to the reference element output in order to keep the color-developing/fading potentials of the primary element at a specific predetermined voltage level.

In a preferred embodiment, the primary electrochromic element includes a pair of electrodes, at least one of which is transparent. Color-developing and electrolyte layers are provided between the electrodes. The color-developing layers may include an oxidation color-developing layer and a reduction color-developing layer. In a preferred arrangement of such an electrochromic device, the output of the reference element is directed to an electrode adjacent the oxidation color-developing layer.

BRIEF DESCRIPTION OF THE DRAWINGS

The features of the present invention that are believed to be novel are set forth with particularity in the appended claims. The invention, together with the objects and advantages thereof, may best be understood by reference to the following description of the presently preferred embodiments together with the accompanying drawings in which:

DETAILED DESCRIPTION OF THE PREFERRED EMBODIMENTS

Figure 1:
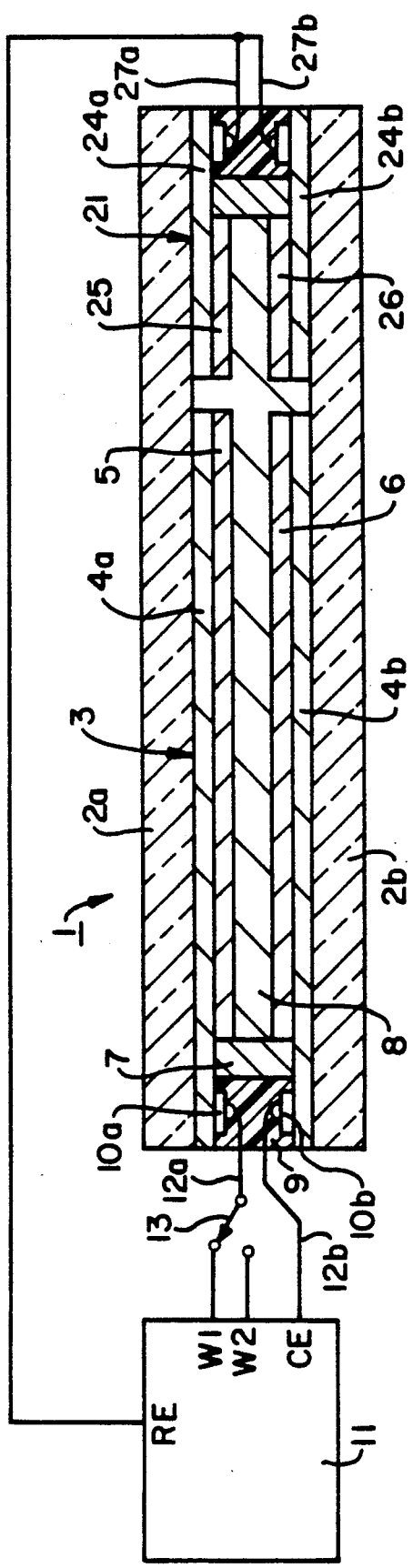
FIG. 1 is a sectional view of an electrochromic device in accordance with the present invention.
Figure 3:
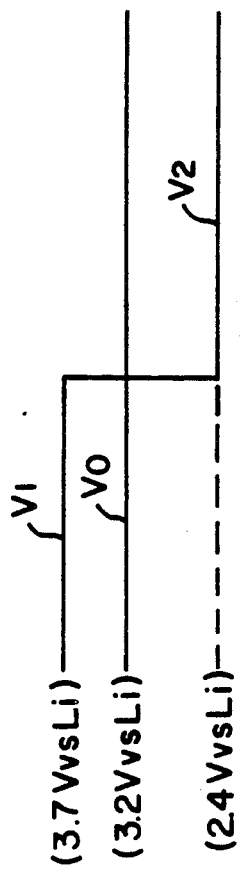
FIG. 3 is a graph showing color-developing/fading potentials of the electrochromic device.

As illustrated in the drawings, a preferred embodiment of the present invention will be described in detail hereinafter. In this embodiment, the electrochromic device is used in a sun roof of an automobile.

Figure 2:
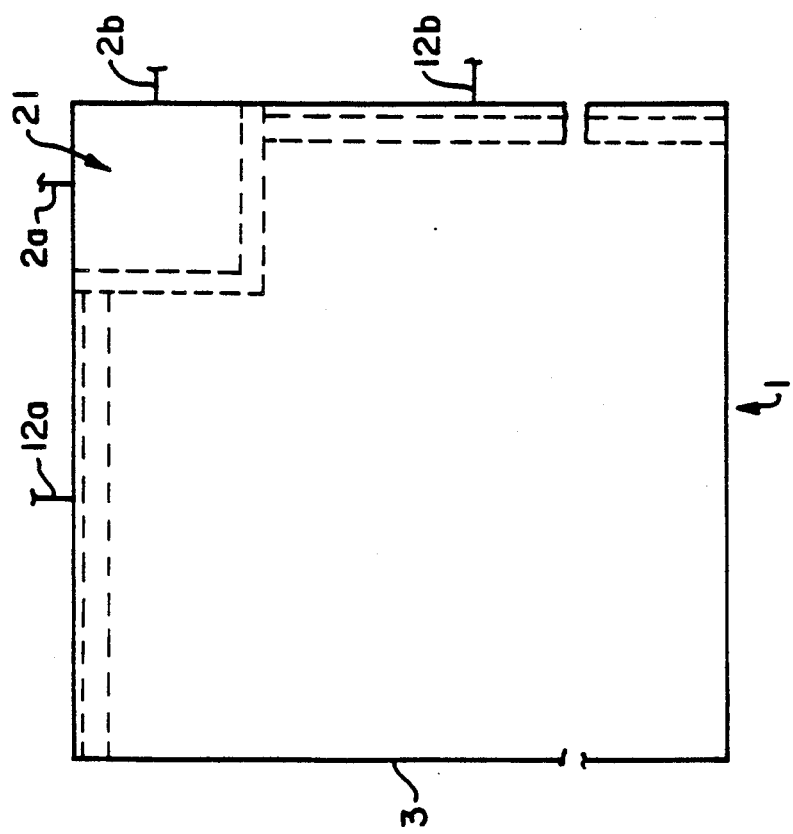
FIG. 2 is a plane view of the electrochromic device.

As shown in FIGS. 1 and 2, the sun roof 1 has upper and lower bases 2a and 2b and the electrochromic element (referred to as ECE hereinafter) 3 is provided therebetween. The bases 2a and 2b are made of a tempered glass plate of $700 \times 500 \times 2.5$ mm respectively. An electrode size, used in a transmission mode, of the ECE 3 is $400 \times 400$ mm (therefore, a cell area thereof is 1600 $cm^2$).

An upper transparent electrode 4a is provided at a lower surface of the upper base 2a. The electrode 4a is made of ITO (indium tin oxide) and may be formed, by way of example, by ion plating, sputtering or the like. A suitable film thickness is about 2000 Å (angstroms).

An oxidation color-developing layer 5 is provided at a lower surface of the upper transparent electrode 4a. The layer 5 is made of polyaniline and may be formed, by way of example, by electrolytic polymerization, catalytic polymerization or the like, thereby becoming a thin film of about 6000 Å (angstroms) thickness. Polypyrrole, polythiophene, or the like can also be used to form the oxidation color-developing layer 5.

A lower transparent electrode 4b is provided at an upper surface of the lower bases 2b. The electrode 4b is made of a thin film of ITO of about 2000 Å (angstroms) thickness just like the upper electrode 4a. A reduction color-developing layer 6 is provided at an upper surface of the lower electrode 4b. The layer 6 is made of tungsten oxide and may be formed, by way of example, by vapor deposition utilizing an electron-beam, ion plating, sputtering or the like, thereby forming a thin film of about 6000 Å (angstroms) thickness. Molybdenum oxide ($MoO_3$), titanium oxide ($TiO_2$) or the like may also be used for the reduction color-developing layer 6.

A spacer 7 is inserted between the bases 2a and 2b so as to keep a constant distance between the bases 2a and 2b. A gelled electrolyte layer 8 is provided between the color-developing layers 5 and 6. By way of example, the electrolyte layer 8 is formed by mixing poly-ethylene oxide with propylene carbonate solution of 1M(mol/l) lithium perchlorate ($LiClO_4$) in a ratio of 1 to 6.

The ECE 3 is sealed by applying an epoxy resin around the periphery of the ECE 3 and hardening the resin to form a seal 9 thereof. The transparent electrodes 4a and 4b each have a surface resistance of about 10 $\Omega/\square$. Conductive pastes 10a and 10b are applied to the opposing surfaces of the electrodes 4a and 4b. Lead wires 12a and 12b are fixed to the conductive pastes 10a or 10b respectively by soldering. The opposing end of the lead wire 12a is connected to a work electrode terminal W1 or W2 of a potentiostat 11 through a switch 13. The second end of the lead wire 12b is connected to the counter electrode terminal CE of the potentiostat 11. The potentiostat 11 also includes a reference terminal RE, and is able to measure the potential of each of the terminals.

The potentiostat 11 includes a power supply such as a battery or the like, a voltage balancing circuit, and a current balancing circuit. The voltage balancing circuit maintains the color-developing/fading potentials V1 and V2 at constant levels. Similarly, the current balancing circuit keeps the color-developing/fading currents at constant levels.

A reference electrochromic element (referred to as a reference ECE hereinafter) 21 having the same design as the ECE 3 is formed within a part of the bases 2a and 2b adjacent to the ECE 3 (at the upper right corner in FIG. 2). The reference ECE 21 shares the electrolyte layer 8 with the ECE 3 and functions as a reference electrode for the ECE 3. Lead wires 27a and 27b are connected to transparent electrodes 24a or 24b respectively of the reference ECE 21. The opposing ends of the lead wires 27a and 27b are directly connected together, are then connected to the reference terminal RE of the potentiostat 11.

Accordingly, the electrodes 24a and 24b are short-circuited via the lead wires 27a and 27b. Thus, an electrical equilibrium can be achieved due to the properties of the oxidation/reduction color-developing layers 25 and 26. The equilibrium potential is 3.2 V relative to a standard lithium electrode.

A method for driving the foregoing ECE 3 will be described hereinafter. As shown in FIG. 1, when the switch 13 is turned on for color-developing, the potentiostat 11 controls the voltage between the work electrode terminal W1 and the counter electrode terminal CE, so that the potential V1 of the color-developing layer 5 becomes larger than the reference potential V0 of the reference ECE 21 by +0.5 V, which means that the potential V1 becomes 3.7 V when compared to a lithium standard. The potentiostat 11 maintains the potential V1 at the +0.5 V level with reference to the reference ECE 21.

Accordingly, due to the electrochemical properties of the color-developing layers, the light transmissivity of the ECE 3 is gradually reduced. The reduced light transmission gives the ECE 3 a blue appearance thereby color-developing the ECE 3. About 20 seconds after the potential V1 is first applied, the oxidation-reduction reaction of ECE 3 comes to a saturation point. Thereafter, light transmissivity and color will remain substantially constant as long as the 3.7 V biasing potential is applied.

When it is desirable to fade the color of the ECE 3, the switch 13 is switched to the terminal W2 such that the color-fading potential V2 is applied to the ECE 3. The potentiostat 11 controls the voltage between the work electrode terminal W2 and the counter electrode terminal CE, so that the potential V2 of the color-developing layer 5 becomes smaller than the reference potential V0 of the reference ECE 21 by −0.8 V, which means that the potential V2 becomes 2.4 V when compared to a lithium standard. Then, the whole is gradually color-faded. After about 15 seconds, the oxidation-reduction reaction of the ECE 3 comes to a saturation point. This oxidation-reduction reaction increases the light transmitted by the ECE 3, thereby resulting in a clearer appearance. Once the reaction has reached a saturation point, the degree of light transmission will remain substantially constant. The color-developing and fading actions can be thus performed.

In the present embodiment, the ECE 3 is driven with reference to the reference potential V0 outputted by the reference ECE 21. Thus, the potential of the oxidation color-developing layer 5 may be maintained at a constant level when the ECE 3 is driven. Therefore, the polyaniline (which is used as the oxidation color-developing layer 5) will last longer and the color can be effectively faded during the fading process because of elimination of the variations in the biasing potential. Thus the ECE 3 has a longer useful life than is possible with conventional designs.

Generally, it is known to use a silver-silver chloride electrode, a lithium electrode or the like as the reference electrode. But it is difficult to insert such reference electrodes into an ECE 3 which has a very thin electrolyte layer 8. The reference ECE 21 of the present embodiment is, however, formed by patterning a part of the ECE 3, so that the reference electrode can be easily formed the same thickness as the ECE 3. As the electrochemical properties of the reference ECE 21 are stable, the device of the present embodiment can effectively control the potentials V1 and V2 of the ECE 3 and can maintain the desirable properties of the oxidation color-developing layer 5.

The present invention can also be embodied in the following forms for example.

When the reference ECE 21 is colored, the potential of the reduction color-developing layer 6 made of tungsten oxide becomes stabilized at 3.0 V against lithium. Therefore, such potential can also be the reference potential V0.

Materials other than tungsten oxide and polyaniline can also be utilized as the color-developing layers 25 and 26 of the reference ECE 21. Liquid or solid electrolyte can also be used as the electrolyte layer 8. One of the bases 2a and 2b can be made opaque to use the ECE 3 as part of a reflective element.

The electrochromic device of the present invention may be used for a wide variety of applications other than the sun roof 1 set forth in the foregoing embodiment. For example, glare-proof mirrors, windows of automobiles, of aircraft, and of buildings, and so on are all suitable applications.

Although only one embodiment of present invention has been described herein, it should be apparent to those skilled in the art that the present invention may be embodied in many other specific forms without departing from the spirit or scope of the invention. Therefore, the present examples and embodiments are to be considered as illustrative and not restrictive and the invention is not to be limited to the details given herein, but may be modified within the scope of the appended claim.

We claim:
1. An electrochromic device comprising:
a pair of bases;
a primary electrochromic element disposed between said bases;
a reference electrochromic element disposed between said bases for generating a predetermined reference voltage to be utilized in the control of the primary electrochromic element, wherein both said pri- mary and reference electrochromic elements include, a pair of electrodes, at least one of which is transparent, an electrolyte disposed between said pairs of electrodes, and color-developing materials provided between said electrodes, the color-developing materials including an oxidation color-developing layer and a reduction color-developing layer, wherein the oxidation and reduction color developing layers in said reference electrochromic element are short circuited to provide the reference voltage; and a power regulator for driving said primary electrochromic element using driving signals, a potential of the driving signals provided by said power regulator being influenced by said reference voltage.

2. An electrochromic device as recited in claim 1 wherein the primary and reference electrochromic elements are formed substantially continuously with said electrolyte being common to both, and said pairs of electrodes and said color-developing materials of said primary and reference electrochromic elements are electrically isolated from one another, respectively.

3. A device as in claim 1 wherein said primary electrochromic element is disposed between said bases at a first location thereof and said reference electrochromic element is disposed between said bases at a second location thereof different than said first location, wherein said electrolyte is disposed commonly between said pairs of electrodes at both said reference and primary electrochromic elements.

4. An electrochromic device as recited in claim 1 further comprising a voltage detecting circuit for detecting a voltage difference between the reference electrochromic element and a component of the primary electrochromic element.

5. An electrochromic device as recited in claim 2 wherein said reduction color-developing layer is made of tungsten oxide.

6. An electrochromic device as recited in claim 2 wherein said oxidation color-developing layer is made of polyaniline.

7. An electrochromic device as recited in claim 2 wherein said electrolyte layer is a mixture of poly-ethylene oxide, lithium perchlorate, and propylene carbonate.

8. An electrochromic device comprising:

a pair of bases;

a primary electrochromic element disposed between said bases;

a reference electrochromic element disposed between said bases, wherein both said primary and reference electrochromic elements include:

a pair of electrodes, at least one of which is transparent, color-developing layers provided between said electrodes, the color-developing layers including an oxidation color-developing layer and a reduction color-developing layer, wherein the color developing layers in said reference electrochromic element are short-circuited to provide the reference voltage, and an electrolyte disposed between said electrodes, the reference electrochromic element outputting a reference voltage to be utilized to control of the primary electrochromic element;

a power regulator for driving said primary electrochromic element;

a voltage detecting circuit connected between said reference electrochromic element and said primary electrochromic element to detect a voltage therebetween; and a switch provided between said power regulator and said primary electrochromic element for selectively coupling said power regulator to said primary electrochromic element, said switch being operated in accordance with the reference voltage outputted by the reference electrochromic element.

9. An electrochromic device as in claim 8 wherein said primary electrochromic element is disposed between said bases at a first location thereof and said reference electrochromic element is disposed between said bases at a second location thereof different than said first location, wherein said electrolyte is disposed commonly between said pairs of electrodes at both said reference and primary electrochromic elements.

* * * * *